(12) United States Patent
Goller et al.

(10) Patent No.: US 7,742,922 B2
(45) Date of Patent: Jun. 22, 2010

(54) SPEECH INTERFACE FOR SEARCH ENGINES

(76) Inventors: Michael D. Goller, 2204 Bluegrass La., Cincinnati, OH (US) 45237; Stuart E Goller, 2204 Bluegrass La., Cincinnati, OH (US) 45237

( * ) Notice: Subject to any disclaimer, the term of this patent is extended or adjusted under 35 U.S.C. 154(b) by 895 days.

(21) Appl. No.: 11/557,971

(22) Filed: Nov. 9, 2006

(65) Prior Publication Data
US 2008/0114747 A1 May 15, 2008

(51) Int. Cl.
*G10L 21/00* (2006.01)
(52) U.S. Cl. .................. 704/270.1; 704/270; 704/257; 704/9; 704/235; 707/51; 707/52
(58) Field of Classification Search ................ 704/257, 704/9, 270.1, 270, 235
See application file for complete search history.

(56) References Cited

U.S. PATENT DOCUMENTS

| | | | |
|---|---|---|---|
| 5,960,399 A | 9/1999 | Barclay et al. | |
| 6,101,472 A | 8/2000 | Giangarra et al. | |
| 6,311,182 B1 | 10/2001 | Colbath et al. | |
| 6,510,417 B1 | 1/2003 | Woods et al. | |
| 6,532,444 B1 | 3/2003 | Weber | |
| 6,604,075 B1 | 8/2003 | Brown et al. | |
| 6,604,076 B1 | 8/2003 | Holley et al. | |
| 6,615,172 B1 * | 9/2003 | Bennett et al. | 704/257 |
| 6,618,726 B1 | 9/2003 | Colbath et al. | |
| 6,665,640 B1 | 12/2003 | Bennett et al. | |
| 6,772,124 B2 * | 8/2004 | Hoffberg et al. | 704/270.1 |
| 6,785,653 B1 | 8/2004 | White et al. | |
| 6,801,604 B2 | 10/2004 | Maes et al. | |
| 6,832,196 B2 | 12/2004 | Reich | |
| 6,882,974 B2 | 4/2005 | James et al. | |
| 6,895,242 B2 | 5/2005 | Fu et al. | |
| 6,934,675 B2 | 8/2005 | Glinski et al. | |
| 6,934,684 B2 * | 8/2005 | Alpdemir et al. | 704/265 |
| 6,954,896 B1 | 10/2005 | Didrill et al. | |
| 6,999,932 B1 | 2/2006 | Zhou | |
| 7,020,609 B2 | 3/2006 | Thrift et al. | |
| 7,027,987 B1 | 4/2006 | Franz et al. | |
| 7,050,977 B1 * | 5/2006 | Bennett | 704/270.1 |
| 7,054,818 B2 | 5/2006 | Sharma et al. | |
| 7,058,580 B2 | 6/2006 | Ueyama et al. | |
| 7,058,626 B1 * | 6/2006 | Pan et al. | 1/1 |
| 7,080,003 B2 | 7/2006 | Komatsu | |
| 7,082,397 B2 | 7/2006 | Cohen et al. | |

(Continued)

Primary Examiner—Vijay B Chawan (57) ABSTRACT

An embodiment provides search results from a speech initiated search query. The system receives voiced utterances from a user, converts the voiced utterances through use of a speech recognition application, system or method into data strings, identifies from the data strings a search engine identifier representing a search engine chosen by the user to perform a search, identifies from the data strings a query term to be searched for, modifies the query term to be searched for by replacing any spaces in the query term to be searched for with a query term separator compatible with the search engine represented by the search engine identifier thereby creating a modified query term to be searched for, constructs a uniform resource locator that includes the modified query term to be searched for such that the constructed uniform resource locator represents a valid request to the search engine represented by the search engine identifier, opens the constructed uniform resource locator which causes the chosen search engine to make a search for the modified query term, and provides the results of the search system to the user.

38 Claims, 4 Drawing Sheets

U.S. PATENT DOCUMENTS

| | | |
|---|---|---|
| 7,092,887 B2 | 8/2006 | Mozer et al. |
| 7,103,550 B2 | 9/2006 | Gallagher et al. |
| 7,120,585 B2 | 10/2006 | Boulanov |
| 7,139,715 B2 | 11/2006 | Dragosh et al. |
| 7,146,323 B2 | 12/2006 | Guenther et al. |
| 7,203,646 B2 * | 4/2007 | Bennett ............ 704/257 |
| 7,376,556 B2 * | 5/2008 | Bennett ............ 704/215 |
| 2003/0115289 A1 | 6/2003 | Chinn et al. |
| 2006/0064499 A1 | 3/2006 | Sharma et al. |
| 2006/0069570 A1 * | 3/2006 | Allison et al. ............ 704/270 |
| 2006/0143007 A1 | 6/2006 | Koh et al. |
| 2006/0248062 A1 | 11/2006 | Libes et al. |
| 2007/0005570 A1 | 1/2007 | Hurst-Hiller et al. |
| 2007/0016570 A1 | 1/2007 | Venkata et al. |

* cited by examiner

SPEECH INTERFACE FOR SEARCH ENGINES

FIELD OF INVENTION

The present invention relates generally to search engines and, more specifically, to speech recognition interfaces for search engines.

BACKGROUND OF THE INVENTION

As networks and the internet have become pervasive and used by businesses and individuals around the world, more data is stored in storage mediums attached to networks and the internet. Data is defined as any information whether it be text, images, video, audio or other representational or non-representational information. Search engines and directories were created by many individuals and companies with the explicit purpose of fielding queries from users, making searches of stored data, then, returning the results of the query to the user. Currently, search engines and directories such as Cha Cha, Google, Yahoo, Wikipedia, About, AltaVista, Ask, MSN Search, AOL Search, Open Directory (DMOZ), Looksmart, Lycos and other search engines provide their search service via servers connected to networks and the internet. Users generally connect to search engines via client devices connected to networks or the internet.

The primary mechanism of making a search of a search engine is to navigate to a web page of the search engine where a form is presented. The user manually types characters, words, or phrases known as a query term into this form and clicks a button on the form or the "Enter" key on the keyboard to transmit the query term to the search engine for processing. No search engine currently offers an implemented solution allowing users to make queries by speaking the query term into a voice or speech recognition system, converting the spoken words to data and then processing the data to perform a search engine query.

Speech recognition technology has developed over the past 25 years to the point that speech recognition systems are available from multiple sources for use in automated speech recognition telephone directories, as word processing systems, as dictation systems and in embedded systems. They function at variable levels of effectiveness due to limitations of the software understanding the complexities and variabilities of human speech. Attempts to utilize speech recognition in making search engine queries have been very limited. One example is the use of speech recognition in cell phones where a limited set of keywords are programmed into the system, to be recognized when a user speaks into a cell phone. The keywords act as an index of a cell phone's directory, but the system does not allow query term searches of search engines to be made by speaking conversational words into a cell phone. In addition, off the shelf speech recognition software does not allow for direct speech recognition instigated query term searches of search engines on the internet.

In addition to the foregoing systems the "Voice Interface for a Search Engine", U.S. Pat. No. 7,027,987 discloses a system that receives a voice search query from a user, derives one or more recognition hypotheses, each being associated with a weight, from the voice search query, and constructs a weighted boolean query using the recognition hypotheses. The system then provides the weighted boolean query to a search system and provides the results of the search system to a user, the uniqueness of the system being it's recognition hypotheses, weighting methods and construction of weighed boolean query. The patent clearly describes a specific method of speech recognition, and is not functional with other speech recognition methods.

In another example shown by "Language Independent Search System", U.S. Pat. No. 6,999,932 the patent discloses a language independent, voice based user interface method that includes receiving voice input data spoken by a user, identifying a language spoken by the user from the voice input data, converting the voice input data into a first text in the identified language by recognizing the user's speech in the voice input data based at least in part on the language identifier, parsing the first text to extract a keyword, and using the keyword as a command to an application. Further actions include receiving results of the command, converting the results into a second text in a natural language format according to the identified language, and rendering the second text for perception by the user. This patent clearly describes a method requiring identifying a users spoken language, and then requiring parsing of speech input data for keywords, the keywords then being used as commands for an application.

In another example shown by "Voice Activated Web Browser", U.S. Pat. No. 6,618,726 discloses a method where words are analyzed and searched against a database of topics or micro-domain areas looking for keywords. If a match occurs the words are analyzed by a subprogram associated with the specific topic area and key words are identified and other words discarded. The key words are input to a search engine or the equivalent. If no keywords are found this method parses words, inputting recognized words into an identification module where particular word groups are recognized. The keywords are identified and other words are dropped. The string of search words is then delivered to a search engine or other search facility. This patent clearly describes a method requiring making a search by analyzing and searching words against a database of topics or micro-domain areas looking for keywords and use of a subprogram to prepare keywords for input into search engine or equivalent making it difficult for non-keywords to be searched.

In another example shown by "Methods and Systems for Enabling Speech-based Internet Searches", U.S. Pat. No. 6,934,675 discloses a system that envisions the generation of a merged word or phoneme grammar based on statistical measures, such as cohort probabilities and N-gram probabilities. Phonemes associated with spoken words contained in speech-based Internet searches are compared against either grammar to identify documents, web sites, or web pages (collectively "web sites") which contain words which match, or are correlated to, the spoken words. The patent clearly describes a specific speech recognition method requiring generating a merged word or phoneme grammar based on statistical measures.

In another example shown by "Speech recognition method for activating a hyperlink of an internet page", U.S. Pat. No. 6,604,076 clearly requires determining hypertexts of the hyperlinks in text information, determining corresponding first phoneme sequences of hypertexts, receiving a spoken command from a user, determining a second phoneme sequence corresponding to the spoken command, determining the hyperlink selected by the user using the first and second phoneme sequences, activating the selected hyperlink.

In another example patent application 20030115289 "Navigation in a voice recognition system" shows a method of navigating a data structure comprising a plurality of nodes, each node associated with content from a content source and at least a keyword defining the content. This embodiment requires keywords and nodes in order to operate.

In another example patent application 20060143007 "User interaction with voice information services" shows a method for speech recognition that improves recognition accuracy and the overall user experience by involving the user in a collaborative process for disambiguating possible recognition results. This is a server side speech recognition system requiring initial grammars, constrained grammars, initial entity spaces, constrained entity spaces, iterative recognition sets, iterative presentation sets and speech engine configuration and control modules.

Therefore, what is needed is a speech interface for creating a query term which is then searched for in a user chosen search engine, that can function with a variety of speech recognition systems or methods, that can perform query term searches in a variety of different search engines.

SUMMARY OF THE INVENTION

A system and method consistent with the present invention address this and other needs by providing a speech interface for search engines that is capable of returning relevant results.

In accordance with the purpose of the invention as embodied and broadly described herein, a method that provides search results includes: receiving voiced utterances from a user; converting the voiced utterances through use of a speech recognition application, system, or method into data strings; identifying from the data strings a search engine identifier representing a search engine chosen by the user to perform a search; identifying from the data strings a query term to be searched for; modifying the query term to be searched for by replacing any spaces in the query term to be searched for with a query term separator compatible with the search engine represented by the search engine identifier, thereby, creating a modified query term to be searched for; constructing a uniform resource locator that includes the modified query term to be searched for, such that the constructed uniform resource locator represents a valid request to the search engine represented by the search engine identifier; opening the constructed uniform resource locator which causes the chosen search engine to make a search for the modified query term; and providing the results of the search system to the user.

In another implementation consistent with the present invention, a computing system includes a memory and a processor. The memory stores information processed by the processor as needed. The processor receives voiced utterances from a user; converts the voiced utterances through use of a speech recognition application, system, or method into data strings; identifies from the data strings a search engine identifier representing a search engine chosen by the user to perform a search; identifies from the data strings a query term to be searched for; modifies the query term to be searched for by replacing any spaces in the query term to be searched for with a query term separator specific to the search engine represented by the search engine identifier, thereby, creating a modified query term to be searched for; constructs a uniform resource locator that includes the modified query term to be searched for, such that the constructed uniform resource locator represents a valid request to the search engine represented by the search engine identifier; opens the constructed uniform resource locator which causes the chosen search engine to make a search for the modified query term; and provides the results of the search system to the user.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings identify the same or similar elements. Also the following detailed description does not limit the invention. Instead, the scope of the invention is defined by the appended claims.

Exemplary Network

Figure 1:
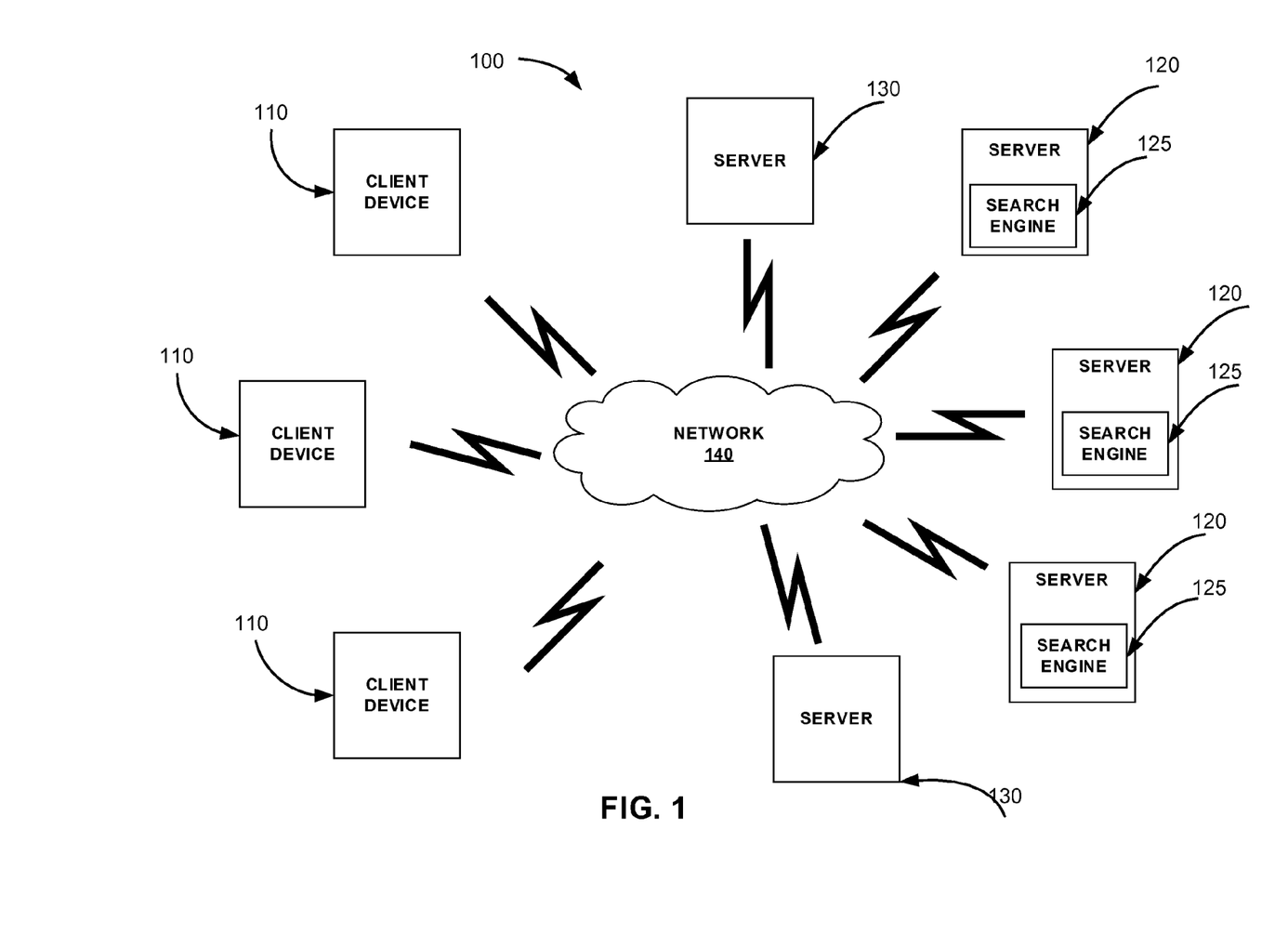
FIG. 1 illustrates an exemplary network in which a system and a method, consistent with the present invention may be implemented.

FIG. 1 illustrates an exemplary network 100 in which a system and method, consistent with the present invention, may be implemented. The network 100 may include multiple client devices 110 connected to multiple servers 120 and other types of servers 130 via a network 140. The network 140 may include a local area network (LAN), a wide area network (WAN), a telephone network, such as the Public Switched Telephone Network (PSTN), an intranet, the Internet, or a combination of networks. Three client devices 110 and three servers 120 and three other types of servers 130 have been illustrated as connected to network 140 for simplicity. In practice, there may be more or less client devices and servers and other types of servers. Also, in some instances, a server may perform the functions of a client device and a client device may perform the functions of a server.

The client devices 110 may include devices, such as mainframes, minicomputers, personal computers, laptops, personal digital assistants, telephones, console gaming devices, set top boxes, cell phones or the like, capable of connecting to the network 140. The client devices 110 may transmit data over the network 140 or receive data from the network 140 via a wired, wireless, or optical connection.

The servers 120-130 may include one or more types of computer systems, such as a mainframe, minicomputer, or personal computer, capable of connecting to the network 140 to enable servers 120-130 to communicate with the client devices 110. In alternative implementations, the servers 120-130 may include mechanisms for directly connecting to one or more client devices 110. The servers 120-130 may transmit data over network 140 or receive data from the network 140 via a wired, wireless, or optical connection.

A search engine 125 may be a search engine such as Google, Yahoo, Wikipedia, About, AltaVista, Ask, MSN Search, AOL Search, Open Directory (DMOZ), Looksmart, Lycos or other search engine. Three different search engines 125 have been illustrated as residing in three different servers 120. In practice, the network 140 may comprise more or less servers 120 with each server containing one or more search engines 125.

Exemplary Client Architecture

Figure 2:
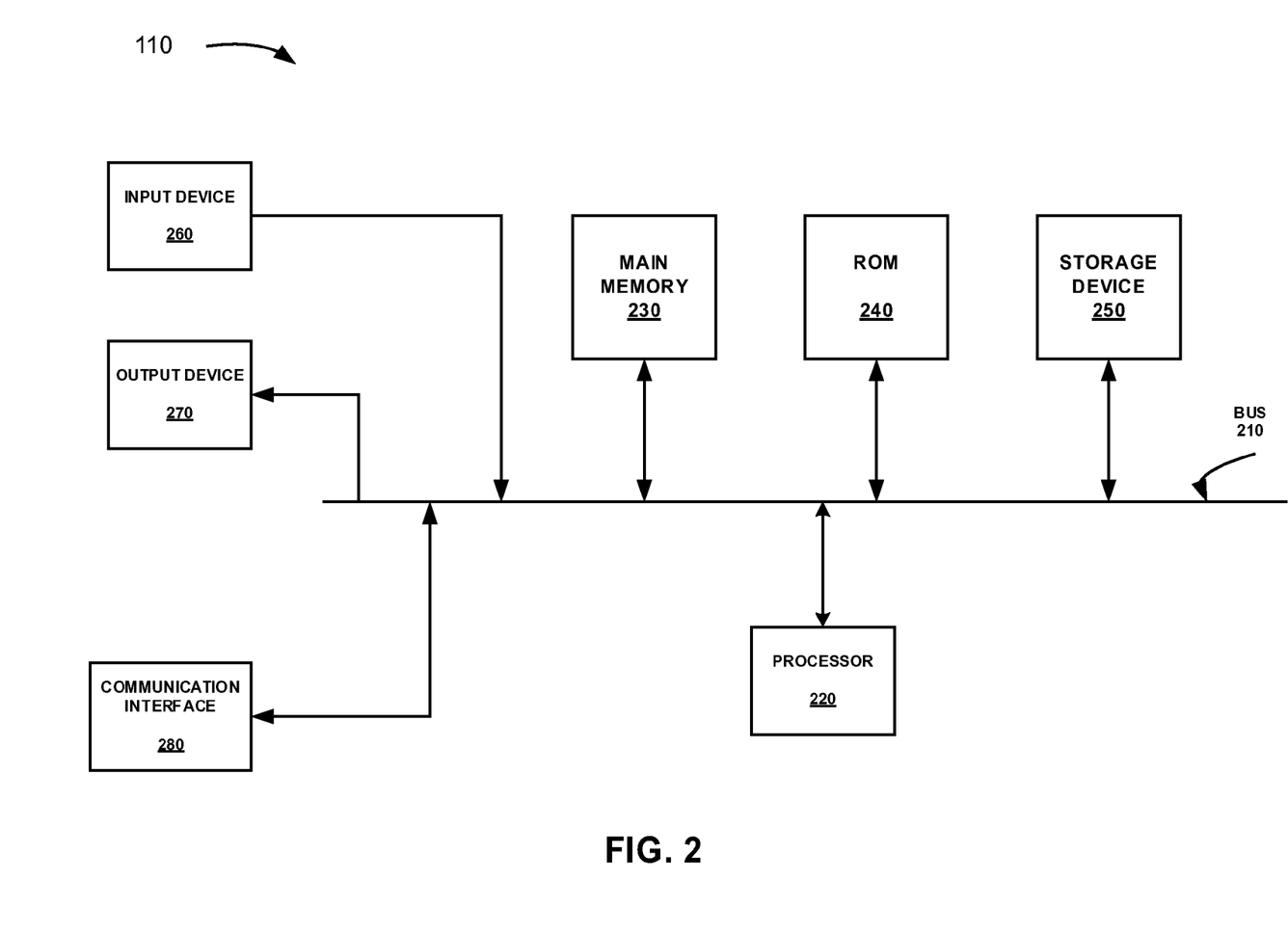
FIG. 2 illustrates an exemplary client device consistent with the present invention.

FIG. 2 illustrates an exemplary client device 110 consistent with the present invention. The client device 110 may include a bus 210, a processor 220, a main memory 230, a read only memory (ROM) 240, a storage device 250, an input device 260, an output device 270, and a communication interface

280. The bus 210 may include one or more conventional buses that permit communication among the components of the client device 110.

The processor 220 may include any type of conventional processor or microprocessor that interprets and executes instructions. The main memory 230 may include a random access memory (RAM) or another type of dynamic storage device that stores information and instructions for execution by the processor 220. The ROM 240 may include a conventional ROM device or another type of static storage device that stores static information and instructions for use by the processor 220. The storage device 250 may include a magnetic and/or optical recording medium and its corresponding drive.

The input device 260 may include one or more conventional mechanisms that permit a user to input information to the client device 110, such as a keyboard, a mouse, a pen, a microphone, voice recognition and/or biometric mechanisms, etc. The output device 270 may include one or more conventional mechanisms that output information to the user, including a display, a printer, a speaker, etc. The communication interface 280 may include any transceiver-like mechanism that enables the client device 110 to communicate with other devices and/or systems. For example, the communication interface 280 may include mechanisms for communicating with another device or system via a network, such as network 140.

As will be described in detail below, the client devices 110, consistent with the present invention, perform certain searching-related operations. The client devices 110 may perform these operations in response to processor 220 executing software instructions contained in a computer-readable medium, such as memory 230. A computer-readable medium may be defined as one or more memory devices and/or carrier waves.

The software instructions may be read into memory 230 from another computer-readable medium, such as the data storage device 250, or from another device via the communication interface 280. The software instructions contained in memory 230 causes processor 220 to perform the search-related activities described below. Alternatively, hardwired circuitry may be used in place of or in combination with software instructions to implement processes consistent with the present invention. Thus, the present invention is not limited to any specific combination of hardware circuitry and software.

Exemplary Server

Figure 3:
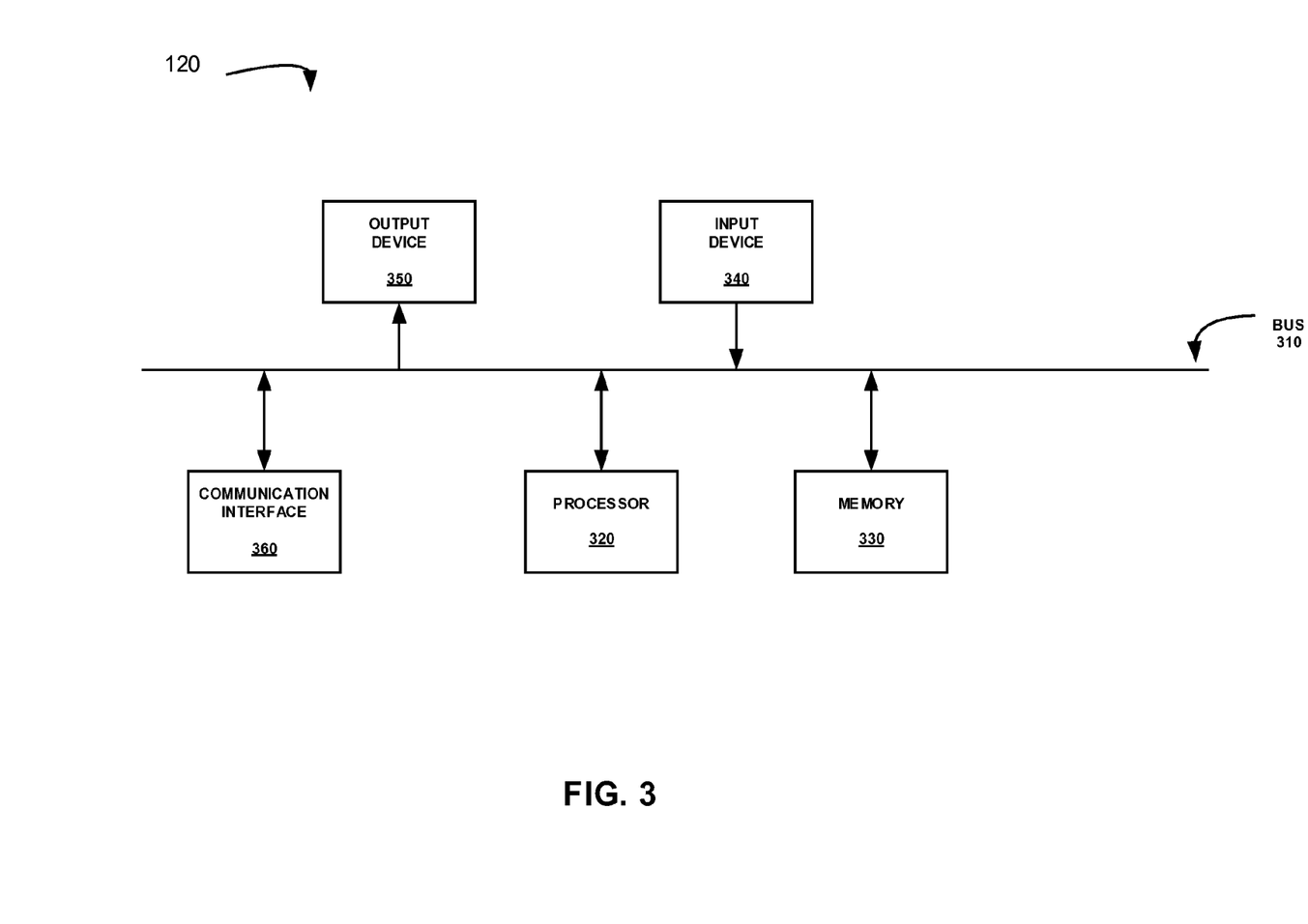
FIG. 3 illustrates an exemplary server consistent with the present invention.

FIG. 3 illustrates an exemplary server 120 consistent with the present invention. Server 130 may be similarly configured. The server 120 includes a bus 310, a processor 320, a memory 330, an input device 340, an output device 350, and a communication interface 360. The bus 310 may include one or more conventional buses that allow communication among the components of the server 120.

The processor 320 may include any type of conventional processor or microprocessor that interprets and executes instructions. The memory 330 may include a RAM or another type of dynamic storage device that stores information and instructions for execution by the processor 320; a ROM or another type of static storage device that stores static information and instructions for use by the processor 320; and/or some type of magnetic or optical recording medium and its corresponding drive.

The input device 340 may include one or more conventional devices that permits an operator to input information to the server 120, such as a keyboard, a mouse, a pen, a microphone, voice recognition and/or biometric mechanisms, and the like. The output device 350 may include one or more conventional devices that outputs information to the operator, including a display, a printer, a speaker, etc. The communication interface 360 may include any transceiver-like mechanism that enables the server 120 to communicate with other devices and/or systems. For example, the communication interface 360 may include mechanisms for communicating with other servers 130 or the client devices 110 via a network, such as network 140.

Execution of the sequences of instructions contained in memory 330 causes processor 320 to perform the functions described below. In alternative embodiments, hardwired circuitry may be used in place of or in combination with software instructions to implement the present invention. Thus, the present invention is not limited to any specific combination of hardware circuitry and software.

Exemplary Processing

Figure 4:
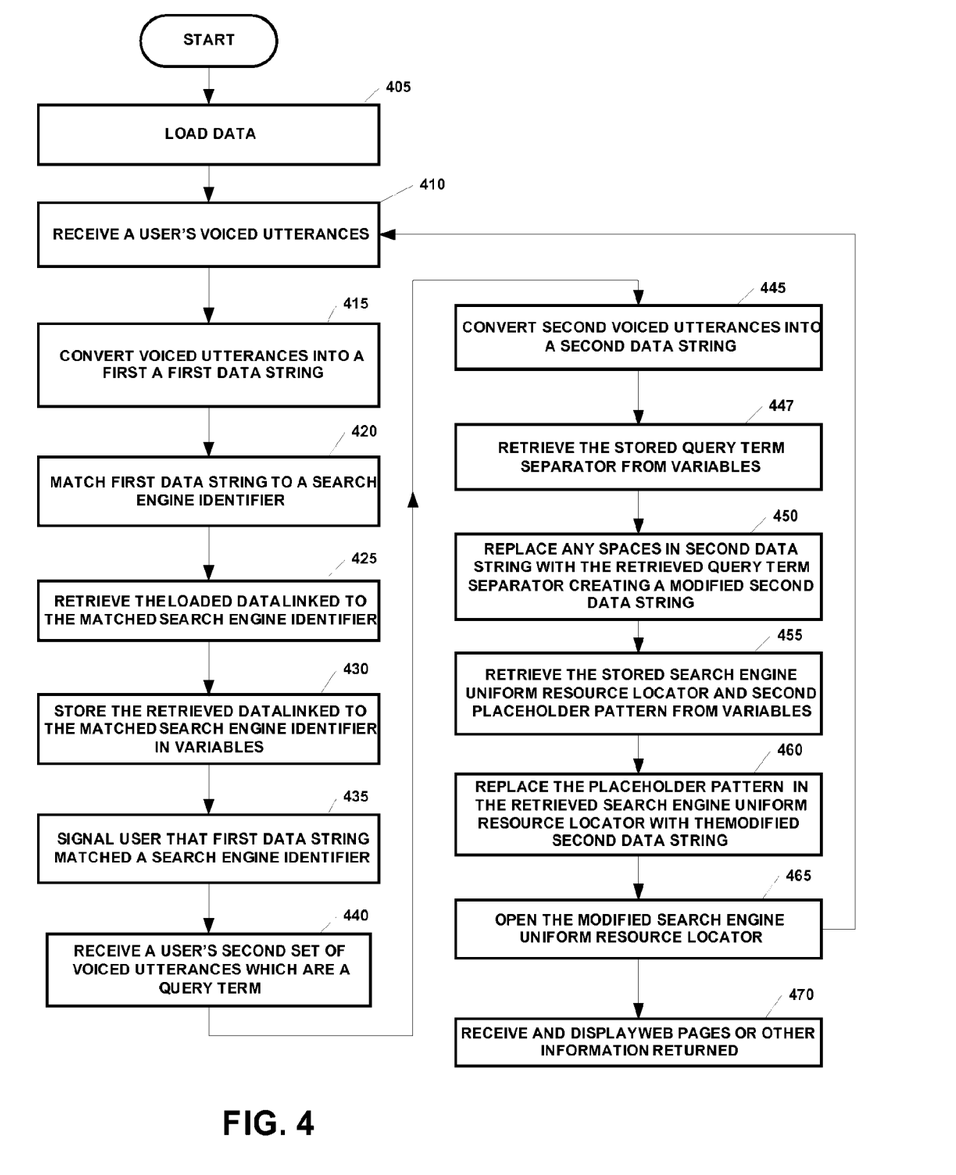
FIG. 4 illustrates an exemplary process consistent with the present invention, for performing a speech initiated query term search.

FIG. 4 illustrates an exemplary process, consistent with the present invention, for performing a speech initiated search by a search engine for a query term. In an implementation consistent with the present invention, a client device, such as client device 110, may perform this process. It will be appreciated, however, that a server 120 or server 130 may alternatively perform the entire process or part of the process described below.

Processing may begin with a client device such as client device 110 loading one or more sets of data [act 405] that may comprise one or more search engine identifiers, one or more search engine uniform resource locators, one or more second placeholder patterns, and one or more query term separators, where components of the data sets may exhibit the following features:

(A) each search engine identifier may represent a search engine 125 residing in a server 120;

(B) examples of search engine identifiers for a search engine 125 residing in a server 120 may include: "Search Yahoo", "Google", "One", "Seven Airplane", "Go Ask", "Go Search Engine", "MSN", "My Searches", "Dog House", "Searching", or other words or word fragments;

(C) each search engine identifier may have linked to it a search engine uniform resource locator, a second placeholder pattern, and a query term separator;

(D) each search engine uniform resource locator may comprise:
(a). scheme,
(b). host,
(c). path,
(d). query comprising: a first placeholder pattern representing a value in a name value pair;

(E) each second placeholder pattern may be identical to the first placeholder pattern.

Processing may continue with the client device 110 receiving a user's voiced utterances signifying a choice of a search engine [act 410]. The voiced utterances may be be received via the client device's 110 input device 260 or over the network 140 via a separate device, such as a different client device 110 or a sever 120-130.

The client device 110 may process the voiced utterances in a well known manner converting the voiced utterances into a first data string [act 415]. For example a speech recognition system located in client device 110 may process the voiced utterances into a first data string.

The client device 110 may match the first data string to the loaded search engine identifiers [act 420] to find a search engine identifier corresponding to the first data string.

If a match is made between the first data string and a search engine identifier the client device 110 may retrieve the loaded search engine uniform resource locator, second placeholder pattern, and query term separator linked to the matched search engine identifier [act 425].

The client device 110 may store the retrieved linked search engine uniform resource locator, second placeholder pattern, and query term separator, in variables [act 430].

The client device 110 may signal the user that the first data string matched a search engine identifier [act 435].

The client device 110 may receive a user's second set of voiced utterances that may comprise a query term to be searched for by the search engine 125 in server 120 [act 440]. The voiced utterances may be received via the client device's 110 input device 260 or over the network 140 via a separate device, such as a different client device 110 or a sever 120-130.

The client device 110 may process the second set of voiced utterances in a well known manner converting the voiced utterances into a second data string [act 445]. For example a speech recognition system located in client device 110 may process the second set of voiced utterances into a second data string.

The client device 110 may then retrieve the query term separator stored in the variables [act 447].

The client device 110 may then replace any spaces in the second data string with the retrieved query term separator, performing concatenation, creating a modified second data string [act 450].

The client device 110 may then retrieve the search engine uniform resource locator and second placeholder pattern stored in the variables [act 455].

The client device 110 may then process the retrieved second placeholder pattern in a well known manner to identify the identical first placeholder pattern within the retrieved search engine uniform resource locator. The client device 110 may then replace the first placeholder pattern in the retrieved search engine uniform resource locator with the modified second data string, creating a modified search engine uniform resource locator [act 460].

The client device 110 may then open the modified search engine uniform resource locator, which was constructed specifically for user chosen search engine 125 in server 120, through network 140 via a uniform resource locator transmission method [act 465].

In an implementation consistent with the present invention, the client device 110 may receive and display web pages or other information returned by opening the modified search engine uniform resource locator [act 470].

In an implementation consistent with the present invention, the client device 110 may empty the variables storing the retrieved data linked to the matched search engine identifier, in anticipation of a new search.

CONCLUSION

A system and method consistent with the present invention provide a speech interface for search engines. The system receives voiced utterances from a user, converts the voiced utterances through use of a speech recognition application, system, or method into data strings, identifies from the data strings a search engine identifier representing a search engine chosen by the user to perform a search, identifies from the data strings a query term to be searched for, modifies the query term to be searched for by replacing any spaces in the query term to be searched for with a query term separator compatible with the search engine represented by the search engine identifier thereby creating a modified query term to be searched for, constructs a uniform resource locator that includes the modified query term to be searched for such that the constructed uniform resource locator represents a valid request to the search engine represented by the search engine identifier, opens the constructed uniform resource locator which causes the chosen search engine to make a search for the modified query term, and provides the results of the search system to the user.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, it is possible to identify the query term prior to identifying the search engine identifier with respect to FIG. 4, the order of the acts may be altered in other implementations consistent with the present invention. No element, act, or instruction used in the description of the present application should be construed as critical or essential to the invention unless explicitly described as such.

The scope of the invention is defined by the following claims and their equivalents.

What is claimed is:

1. A method for providing search results comprising the steps of:
   receiving voiced utterances;
   converting said voiced utterances into data;
   identifying from said data, information comprising: (i) a query term to be searched for of a plurality of query terms to be searched for, (ii) a search engine identifier of a plurality of search engine identifiers representing a search engine of a plurality of search engines;
   modifying said query term to be searched for of a plurality of query terms to be searched for by replacing any spaces in said query term to be searched for of a plurality of query terms to be searched for with a query term separator compatible with said search engine of a plurality of search engines creating a modified query term to be searched for;
   constructing a uniform resource locator that includes said modified query term to be searched for, such that said constructed uniform resource locator represents a valid request to said search engine of a plurality of search engines to perform a search;
   opening said constructed uniform resource locator, via a uniform resource locator transmission method of a plurality of uniform resource locator transmissions methods;
   and providing results of the search system.

2. The Method of claim 1, further comprising: receiving and displaying web pages or other information returned by opening said search engine's uniform resource locator.

3. The method of claim 1, wherein converting said voiced utterances into data is performed by a speech recognition application.

4. The method of claim 1, wherein converting said voiced utterances into data is performed by a speech recognition system.

5. The method of claim 1, wherein the voiced utterances comprise conversational speech.

6. The method of claim 1 wherein the application comprises a web browser.

7. The method of claim 1 wherein the application comprises a plug in for a web browser.

8. The method of claim 1 wherein the application comprises a web application.

9. The method of claim 1 wherein identifying a search engine identifier of a plurality of search engine identifiers from said data includes: parsing said data to identify said search engine identifier of a plurality of search engine identifiers.

10. The method of claim 1 wherein identifying said query term to be searched for of a plurality of query terms to be searched for from said data includes: parsing said data to identify said query term to be searched for of a plurality of query terms to be searched for.

11. The method of claim 1 wherein the application is programmed using a platform specific programming language.

12. The method of claim 1 wherein the application is programmed using a cross platform programming language.

13. The method of claim 1 further comprising automatically translating the query term to be searched for into a plurality of automatically selected languages other than a language of a plurality of languages spoken by the user.

14. The method of claim 13, further comprising receiving and displaying web pages or other information returned by opening said constructed uniform resource locator in said language of a plurality of languages spoken by the user.

15. The method of claim 1 wherein identifying said search engine identifier of a plurality of search engine identifiers from said data comprises: comparing said data to a plurality of search engine identifiers, to find a match.

16. A method for providing search results comprising the steps of:
providing sets of data comprising:
(a) one or more search engine identifiers of a plurality of search engine identifiers,
(b) one or more search engine uniform resource locators of a plurality of search engine uniform resource locators,
(c) one or more second placeholder patterns of a plurality of second placeholder patterns,
(d) one or more query term separators of a plurality of query term separators,
and wherein said search engine identifier of a plurality of search engine identifiers represents a search engine of a plurality of search engines,
and wherein said search engine identifier of a plurality of search engines identifiers is linked to components of said sets of data including:
(i) said search engine uniform resource locator of a plurality of search engine uniform resource locators,
(ii) said second placeholder pattern of a plurality of second placeholder patterns, and
(iii) said query term separator of a plurality of query term separators,
and wherein said search engine uniform resource locator of a plurality of search engine uniform resource locators includes:
(a). a scheme of a plurality of schemes,
(b). a host of a plurality of hosts,
(c). a path of a plurality of paths,
(d). a query of a plurality of queries comprising: a first placeholder pattern of a plurality of first placeholder patterns representing a value of a plurality of values in a name value pair of a plurality of name value pairs,
and wherein said second placeholder pattern of a plurality of second placeholder patterns is identical to said first placeholder pattern of a plurality of first placeholder patterns;
loading said sets of data;
receiving voiced utterances from a user of a plurality of users;
converting said voiced utterances into a first data string;
matching said first data string to said sets of data, identifying a corresponding said search engine identifier of a plurality of search engine identifiers;
retrieving data linked to matched said search engine identifier of a plurality of search engine identifiers;
storing retrieved data linked to said matched search engine identifier of a plurality of search engine identifiers in variables;
signaling said user of a plurality of users that said first data string matched a corresponding said search engine identifier of a plurality of search engine identifiers;
receiving a second set of voiced utterances from said user of a plurality of users specifying a query term to be searched for;
converting said second set of voiced utterances into a second data string;
modifying said second data string by replacing any spaces in said second data string with retrieved said query term separator linked to said search engine identifier of a plurality of search engine identifiers, creating a modified second data string;
replacing said first placeholder pattern of a plurality of placeholder patterns in retrieved said search engine uniform resource locator of a plurality of search engine uniform resource locators with said modified second data string creating a modified search engine uniform resource locator;
opening said modified search engine uniform resource locator through a uniform resource locator transmission method of a plurality of uniform resource locator transmission methods;
and providing results of the search system.

17. The Method of claim 16, further comprising: receiving and displaying web pages or other information returned by opening said modified search engine uniform resource locator.

18. The method of claim 16, wherein converting said voiced utterances into data is performed by a speech recognition application.

19. The method of claim 16, wherein converting said voiced utterances into data is performed by a speech recognition system.

20. The method of claim 16, wherein the voiced utterances comprise conversational speech.

21. The method of claim 16 further comprising automatically translating the query term to be searched for into a plurality of automatically selected languages other than a language of a plurality of languages spoken by the user.

22. The method of claim 21, further comprising receiving and displaying web pages or other information returned by opening said constructed uniform resource locator in said language of a plurality of languages spoken by the user.

23. The method of claim 16 wherein the application is programmed using a platform specific programming language.

24. The method of claim 16 wherein the application is programmed using a cross platform programming language.

25. The method of claim 16 wherein the application comprises a web browser.

26. The method of claim 16 wherein the application comprises a plug in for a web browser.

27. The method of claim 16 wherein the application comprises a web application.

28. A physical medium containing instructions for controlling at least one processor to perform a method for generating a search query, comprising:
receiving voiced utterances from a user;

converting said voiced utterances into data;

identifying from said data, information including: (i) a query term to be searched for of a plurality of query terms to be searched for, (ii) a search engine identifier of a plurality of search engines identifiers representing a search engine of a plurality of search engines;

modifying said query term to be searched for of a plurality of query terms to be searched for by replacing any spaces in said query term to be searched for of a plurality of query terms to be searched for with a query term separator compatible with said search engine of a plurality of search engines, creating a modified query term to be searched for;

constructing a uniform resource locator that includes said modified query term to be searched for, such that said constructed uniform resource locator represents a valid request to said search engine of a plurality of search engines to perform a search;

opening said constructed uniform resource locator, via a uniform resource locator transmission method.

29. A computing system comprising: a memory configured to store instructions; and a processor configured to execute the instructions to:

receive voiced utterances from a user;

convert said voiced utterances into data;

identify from said data, information including: (i) a query term to be searched for of a plurality of query terms to be searched for, (ii) a search engine identifier of a plurality of search engines identifiers representing a search engine of a plurality of search engines;

modify said query term to be searched for of a plurality of query terms to be searched for by replacing any spaces in said query term to be searched for of a plurality of query terms to be searched for with a query term separator compatible with said search engine of a plurality of search engines, creating a modified query term to be searched for;

construct a uniform resource locator that includes said modified query term to be searched for, such that said constructed uniform resource locator represents a valid request to said search engine of a plurality of search engines to perform a search;

open said constructed uniform resource locator, via a uniform resource locator transmission method.

30. The apparatus of claim 29, wherein the computing system is a set top box.

31. The apparatus of claim 29, wherein the computing system is a cell phone.

32. The apparatus of claim 29, wherein the computing system is a client device.

33. The apparatus of claim 29, wherein the computing system is a server.

34. The apparatus of claim 29, wherein the computing system is a wireless device.

35. The apparatus of claim 29, wherein the computing system is a personal computer.

36. The apparatus of claim 29, wherein the computing system is a device that retrieves, stores and plays audio.

37. The apparatus of claim 29, wherein the computing system is a device that retrieves, stores and plays video.

38. The apparatus of claim 29, wherein the computing system is a console gaming device.

* * * * *